(12) United States Patent
Mosher

(10) Patent No.: US 8,102,301 B2
(45) Date of Patent: Jan. 24, 2012

(54) SELF-CONFIGURING ADS-B SYSTEM

(75) Inventor: Thomas L. Mosher, Salem, OR (US)

(73) Assignee: Garmin International, Inc., Olathe, KS (US)

( * ) Notice: Subject to any disclaimer, the term of this patent is extended or adjusted under 35 U.S.C. 154(b) by 26 days.

(21) Appl. No.: 12/642,458

(22) Filed: Dec. 18, 2009

(65) Prior Publication Data

US 2011/0148690 A1 Jun. 23, 2011

(51) Int. Cl.
*G01S 13/00* (2006.01)
(52) U.S. Cl. ............ 342/36; 342/37; 342/30; 342/42
(58) Field of Classification Search ............. 342/30–42
See application file for complete search history.

(56) References Cited

U.S. PATENT DOCUMENTS

| | | | | |
|---|---|---|---|---|
| 7,383,124 | B1 * | 6/2008 | Vesel | 701/200 |
| 2007/0132638 | A1 * | 6/2007 | Frazier et al. | 342/455 |
| 2008/0106456 | A1 * | 5/2008 | Ootomo et al. | 342/37 |
| 2008/0120032 | A1 * | 5/2008 | Brandao et al. | 701/300 |
| 2008/0266166 | A1 * | 10/2008 | Schuchman | 342/37 |

OTHER PUBLICATIONS

Printout from http://en.wikipedia.org/wiki/ADS-B, 11 pages, published prior to Dec. 17, 2009.
Garmin GDL 90 Handout, published 2006.
Garmin GDL 90 Installation Manual, published 2006.
Printout from http://en.wikipedia.org/wiki/TCAS, 6 pages, published prior to Dec. 17, 2009.

* cited by examiner

*Primary Examiner* — Timothy A Brainard
(74) *Attorney, Agent, or Firm* — Samuel M. Korte

(57) ABSTRACT

Techniques are described that allow information to be acquired by an ADS-B system of an aircraft without the installation of ADS-B dedicated flight crew controls or wired data interfaces in the aircraft. In one or more implementations, a receiver is associated with the ADS-B system in the aircraft. The receiver is configured to receive transmissions from a transponder of the aircraft, such as a radar transponder of a Traffic Collision Avoidance System (TCAS), or the like. Information used by the ADS-B system is extracted from the received transmissions and furnished to the ADS-B transceiver for broadcast over the ADS-B datalink.

17 Claims, 3 Drawing Sheets

SELF-CONFIGURING ADS-B SYSTEM

BACKGROUND

Automatic dependent surveillance-broadcast (ADS-B) is a cooperative surveillance technique used for air traffic control and related applications. ADS-B-equipped aircraft determine their position using a Global Navigation Satellite System (GNSS) such as the United States Global Positioning System (GPS), or other position-determining equipment. The determined position of the aircraft is then combined with other data such as the type of aircraft, the speed of the aircraft, the aircraft's flight number, and whether the aircraft is turning, climbing, or descending and broadcast from the aircraft. Other ADS-B transceivers integrated into the air traffic control system or installed aboard other aircraft use the broadcast information, which is periodically updated, to provide users with an accurate depiction of real-time aviation traffic, both in the air and on the ground.

SUMMARY

Techniques are described that allow information to be acquired by an ADS-B system of an aircraft without the installation of ADS-B dedicated flight crew controls or wired data interfaces in the aircraft. In one or more implementations, a receiver is associated with the ADS-B system in the aircraft. The receiver is configured to receive transmissions from a transponder of the aircraft, such as a radar transponder of a Traffic Collision Avoidance System (TCAS), or the like. Information used by the ADS-B system is extracted from the received transmissions and furnished to the ADS-B transceiver for broadcast over the ADS-B datalink.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

ADS-B equipped aircraft automatically broadcast information such as aircraft position and velocity, Mode 3/A "Squawk" code, IDENT identification, the aircraft's altitude, and so on. When ADS-B is added to an aircraft, control of the ADS-B to provide at least some of this information may be accomplished via manual input by the flight crew (e.g., the pilot, the co-pilot, or the like) or via a wired data interface to other aircraft avionics such as a dedicated control panel or a radar transponder. In instances where manual input is used for control of the ADS-B, such as when the ADS-B transceiver is mounted in the aircraft's instrument panel, the flight crew must enter the information via controls such a knobs, switches, and the like, when changes to the information occur. This manual input of information adds to the workload of the flight crew. In instances where the ADS-B is controlled via a wired data interface, such as when the ADS-B is remotely mounted (i.e. not in the instrument panel), the controlling avionics must be pre-configured to support the wired data interface. Thus, aircraft having avionics that do not support such a wired data interface may require retrofit to support ADS-B installation.

Accordingly, techniques are described that allow information to be furnished to an ADS-B transceiver of an aircraft without the installation of ADS-B dedicated flight crew controls and/or wired data interfaces with other avionics of the aircraft. In one or more implementations, a self-configuring ADS-B system installed within in an aircraft is provided with a receiver. The receiver is configured to receive transmissions from a transponder, such as a radar transponder of a TCAS installation, or the like, of the aircraft. Information that is used by the ADS-B system is extracted from the received transmission and furnished to the ADS-B system to be included in the data broadcast over the ADS-B datalink. In embodiments, the information extracted from the transmissions may be configured (e.g., formatted) for broadcast by the ADS-B system.

In the following discussion, an example aircraft environment employing an ADS-B system is first described. Example functionality is then described that may be implemented by the ADS-B system in the exemplary environment to acquire information from the radar transponder of the aircraft, as well as in other environments without departing from the spirit and scope thereof.

Example Environment

Figure 1:
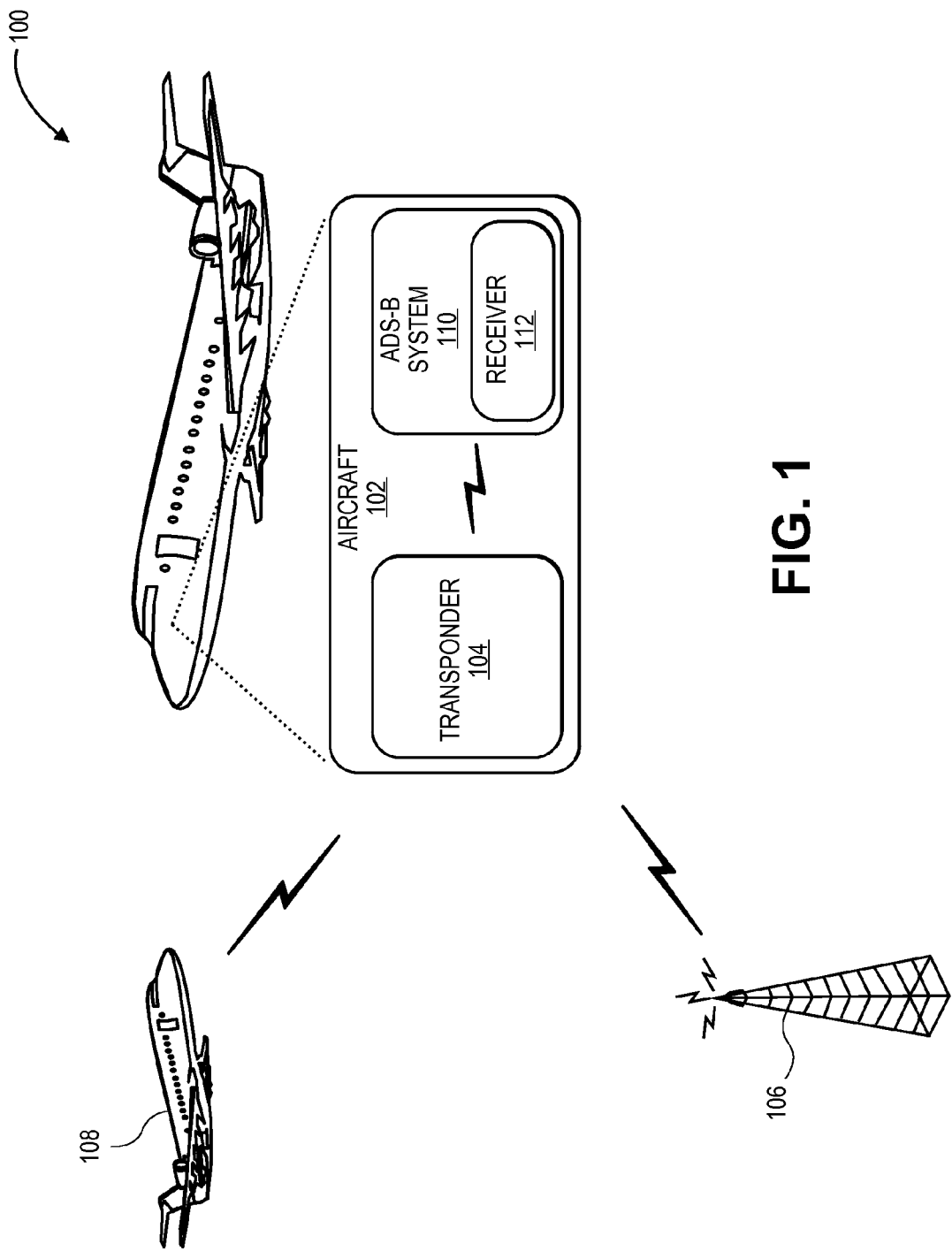
FIG. 1 is an illustration of an environment in an example implementation that includes an aircraft which employs an ADS-B system having a receiver configured to receive transmissions from a transponder of the aircraft.

FIG. 1 illustrates an environment 100 in an example implementation that is operable to furnish information to an ADS-B system within an aircraft without the installation of ADS-B dedicated flight crew controls or a wired data interface to other avionics in the aircraft. The illustrated environment 100 comprises an aircraft 102 equipped with a transponder 104, which may be a radar transponder in an aircraft collision avoidance system such as a TCAS system or the like. Upon receipt of a radio frequency interrogation from an interrogation source such as an air traffic control ground station 106, another aircraft 108, or the like, the transponder 104 is configured to transmit a reply transmission containing information about the aircraft 102. The information transmitted by the transponder 104 may be used by the interrogation source (e.g., air traffic control ground station 106 or aircraft 108) to assist in identifying and tracking the aircraft 102.

In one implementation, the transponder 104 may comprise a radar transponder of a Traffic Collision Avoidance System (TCAS). When interrogated by an air traffic control ground station 106 or the TCAS of another aircraft (e.g., aircraft 108), the transponder 104 may transmit a Mode A, Mode C, or a Mode S reply transmission. These reply transmissions include a variety of information about the aircraft 102, including, but not limited to, an assigned Mode 3/A "squawk" code for the aircraft 102, the IDENT indication for the aircraft 102, the aircraft's altitude, and the like.

As shown in FIG. 1, the aircraft 102 is equipped with an ADS-B system 110. The ADS-B system 110 periodically broadcasts the position of the aircraft 102 determined from a position-determining system such as a global navigation satellite system (GNSS) receiver, or the like over an ADS-B datalink to air traffic control ground stations 106 and/or other aircraft 108. The ADS-B system 110 may further broadcast other relevant information about the aircraft 102 over the datalink.

The ADS-B system 110 includes a receiver 112 configured to receive transmissions from the transponder 104 transmitted in response to interrogation of the transponder 104 by an interrogation source. Information is extracted from the received transmissions for inclusion in the data broadcast by the ADS-B system 110 over the ADS-B datalink. In this manner, the ADS-B system 110 may remain physically independent of the transponder 104 and other aircraft avionics. Thus, information utilized by the ADS-B system 110 installed within the aircraft 102 may be acquired without the installation of ADS-B dedicated flight crew controls and/or a wired data interface to the transponder 104 or other avionics in the aircraft 102.

Figure 2:
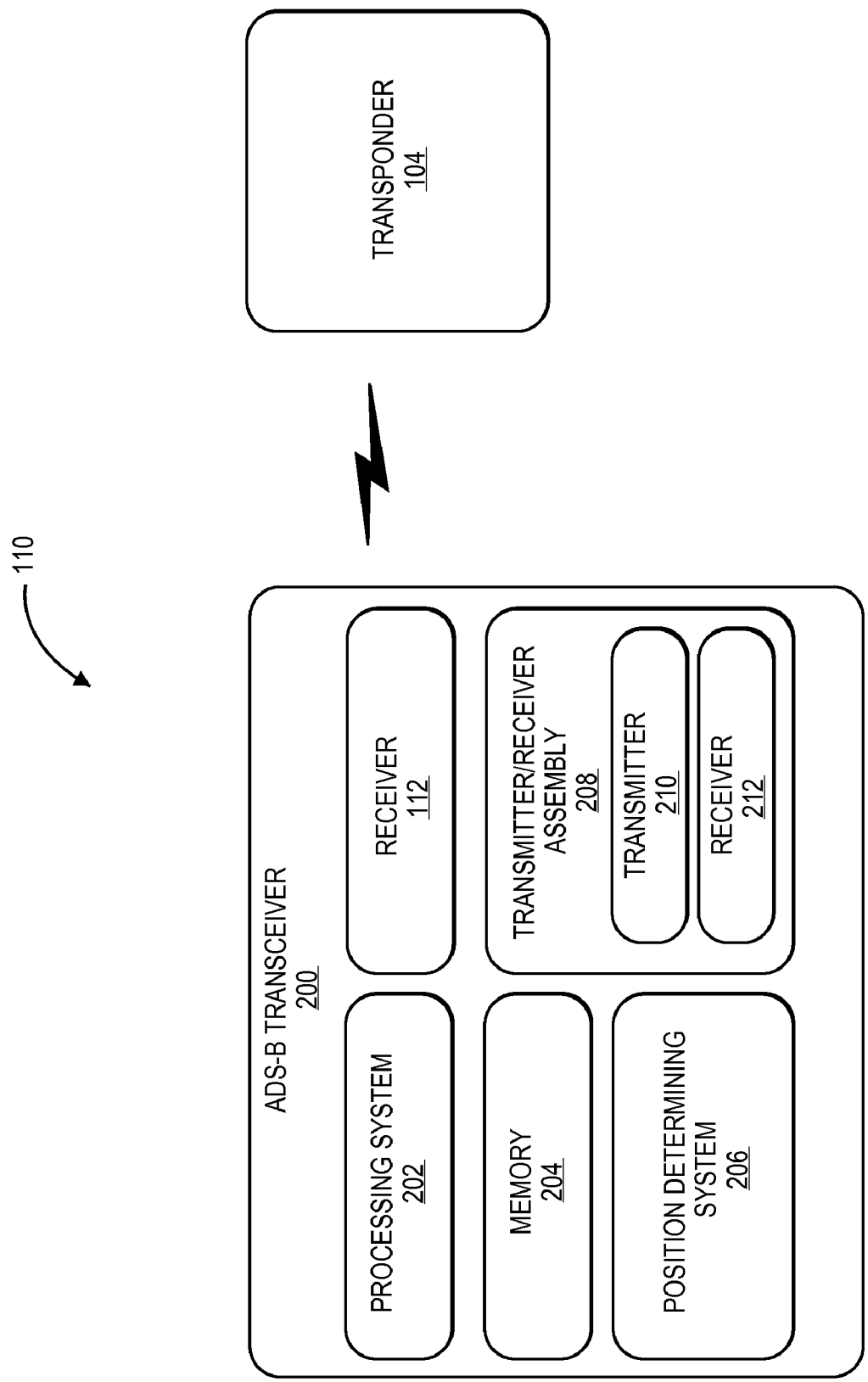
FIG. 2 is an illustration further depicting the ADS-B system and the transponder of the aircraft shown in the example environment of FIG. 1.

FIG. 2 illustrates an example ADS-B system 110 suitable for use by the aircraft 102 in the environment 100 of FIG. 1. In FIG. 2, the ADS-B system 110 is illustrated as being implemented as an ADS-B transceiver 200 suitable for installation within the aircraft 102. However, it is contemplated that other implementations of the ADS-B system 110 are possible.

As shown, the ADS-B transceiver 200 includes a processing system 202, a memory 204, a position determining system 206, a transmitter/receiver assembly 208, and the receiver 112 shown in FIG. 1. The processing system 202 provides processing functionality for the ADS-B transceiver 200 and may include any number of processors, micro-controllers, or other processing systems and resident or external memory for storing data and other information received or generated by the ADS-B transceiver 200. The processing system 202 may execute one or more software programs which implement techniques described herein. The processing system 202 is not limited by the materials from which it is formed or the processing mechanisms employed therein, and as such, may be implemented via semiconductor(s) and/or transistors (e.g., electronic integrated circuits (ICs), programmable logic devices (PLDs), application-specific integrated circuits (ASICs)), and so forth.

The memory 204 is an example of tangible device-readable media that provides storage functionality to store various data associated with the operation of the ADS-B transceiver 200, such as the software programs and code segments mentioned above, or other data to instruct the processing system 202 and other elements of the ADS-B transceiver 200 to perform the steps described herein. Although a single memory 204 is shown, a wide variety of types and combinations of memory may be employed. The memory 204 may be integral with the processing system 202, stand-alone memory, or a combination of both. The memory may include, for example, removable and non-removable memory elements such as Random Access Memory (RAM), Read Only Memory (ROM), Flash memory, magnetic memory, optical memory, and so forth.

The position determining system 206 is configured to provide position-determining functionality for the ADS-B system 110. Position-determining functionality, for purposes of the following discussion, may relate to a variety of different navigation techniques and other techniques that may be supported by "knowing" one or more positions of the aircraft 102 (FIG. 1). For instance, position-determining functionality may be employed to provide location data, velocity data, acceleration data, rate of climb/descent data, heading data, and a variety of other navigation-related data to the processing system 202 for inclusion in transmissions broadcast by the transmitter/receiver assembly 208.

In implementations, the position-determining system 206 may comprise a receiver that is configured to receive signals from one or more position-transmitting sources. For example, the position-determining system 206 may be configured for use with a Global Navigation Satellite System (GNSS). In embodiments, the position-determining system 206 may be a Global Positioning System (GPS) receiver operable to receive navigational signals from GPS satellites and to calculate a location of the aircraft 102 as a function of the signals. Other exemplary position-determining systems include, but are not limited to, a Global Orbiting Navigation Satellite System (GLONASS), a Galileo navigation system, and/or other satellite or terrestrial navigation systems.

As illustrated in FIGS. 1 and 2, the position-determining system 206 may be integral with the ADS-B system 110. In other implementations, the position-determining system 206 may be configured as one or more separate avionics components that communicate position information with the ADS-B system 110 via a wired or wireless interface. A variety of configurations are possible.

The transmitter/receiver assembly 208 provides functionality to periodically broadcast information about the aircraft 102 and to receive periodic broadcasts containing such information from other aircraft and ground stations over an ADS-B datalink. Accordingly, in FIG. 2, the transmitter/receiver assembly 208 is illustrated as including a transmitter 210 and a receiver 212. However, other configurations (e.g., a transceiver, multiple transmitters and/or receivers, etc.) are possible. In various embodiments, the transmitter/receiver assembly 208 may employ any of several different data link technologies, including but not limited to Mode-S Extended Squitter (1090 ES), Universal Access Transceiver (978 MHz UAT), and VHF data link (VDL Mode 4).

The receiver 112 provides functionality to receive transmissions from the transponder 104 of the aircraft 102 that are transmitted in response to interrogation of the transponder 104 by an interrogation source. As noted, in one or more embodiments, the transponder 104 may comprise a radar transponder of a Traffic Collision Avoidance System (TCAS). In such embodiments, the transponder 104 may be configured to detect interrogations transmitted at a frequency of 1030 MHz by ground stations or other TCAS equipped aircraft (e.g., air traffic control ground station 106 or aircraft 108 of FIG. 1). When an interrogation is detected, the transponder 104 transmits a 1090 MHz Mode A, Mode C, or a Mode S reply transmission. Accordingly, in such implementations, the receiver 112 may comprise a 1090 MHz receiver configured to receive the 1090 MHz Mode A, Mode C, or Mode S reply transmissions transmitted by the radar transponder of the TCAS installation.

Information that may be used by the ADS-B system 110 such as the assigned Mode 3/A "squawk" code for the aircraft 102, the IDENT indication for the aircraft 102, the aircraft's altitude, and the like, may then be extracted from the received transmission by the processing system 202 for broadcast by transmitter/receiver assembly 208 of the ADS-B system 110 over the ADS-B datalink. In this manner, information utilized by an ADS-B system 110 installed within the aircraft 102 may be acquired without the installation of ADS-B dedicated flight crew controls and/or a wired data interface to the transponder 104 or other avionics in the aircraft 102.

Generally, functions described herein can be implemented using software, firmware, hardware (e.g., fixed logic circuitry), manual processing, or a combination of these implementations. The term "functionality" as used herein generally represent software, firmware, hardware or a combination thereof. In the case of a software implementation, for instance, functionality may refer to executable instructions that perform specified tasks when executed on a processor, such as a processor of processing system 202 of the ADS-B transceiver 200 of FIG. 2. The program code can be stored in one or more device readable media, an example of which is the memory 204 of the ADS-B system 110 of FIG. 2.

Example Procedures

The following discussion describes procedures that allow information to be acquired by an ADS-B system without the installation of ADS-B dedicated flight crew controls or wired data interfaces in the aircraft. Aspects of procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the ADS-B transceiver 200 of FIG. 2.

Figure 3:
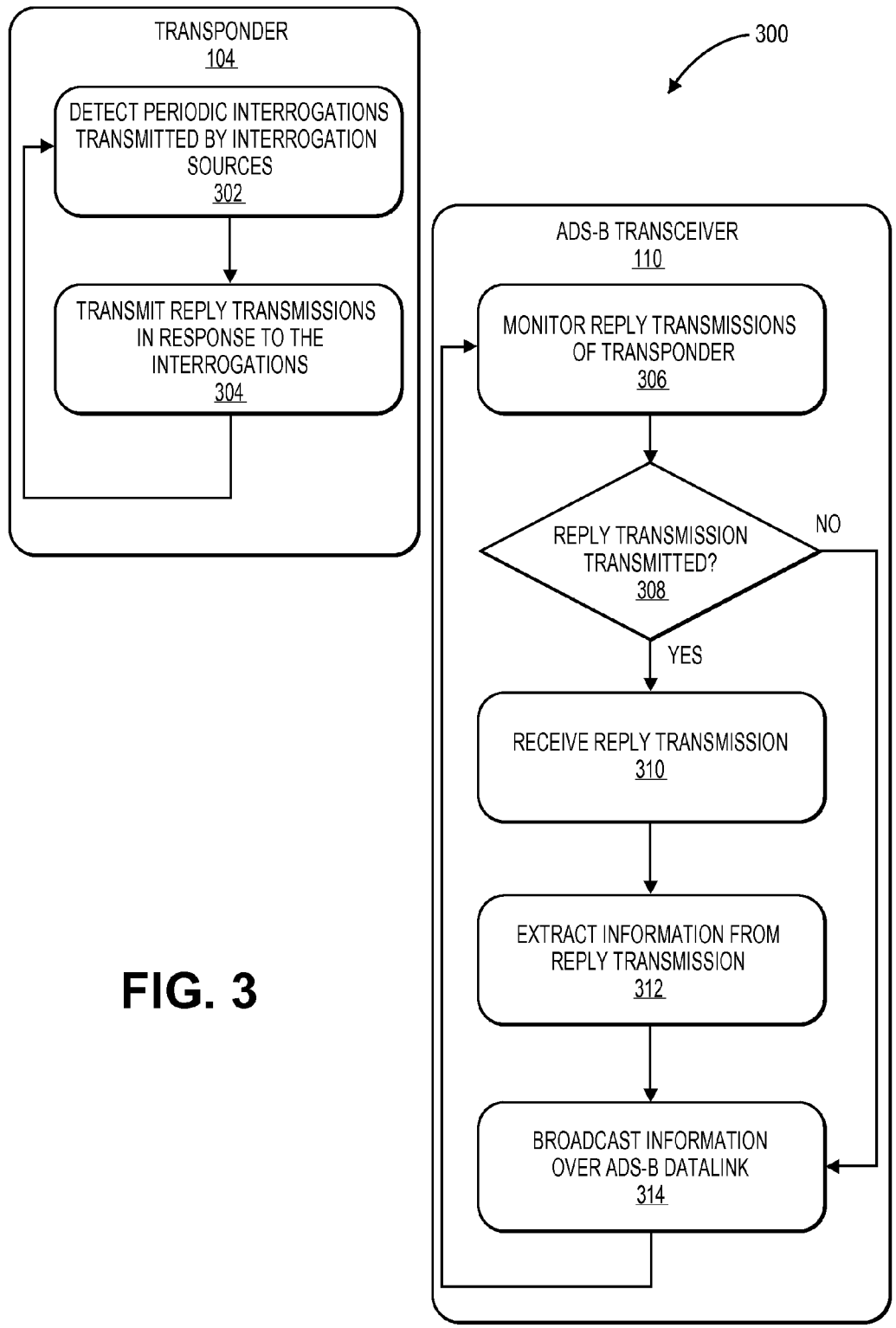
FIG. 3 is a flow diagram depicting a procedure in an example implementation in which information is acquired by an ADS-B system equipped with a receiver configured to receive transmissions from a transponder of the aircraft.

FIG. 3 depicts a procedure 300 in an example implementation in which information is acquired by an ADS-B system of an aircraft, wherein the ADS-B system is equipped with a receiver configured to receive transmissions from a transponder of the aircraft. As illustrated, the transponder 104 of the aircraft in which the ADS-B system 110 is installed detects a periodic interrogations transmitted by an interrogation source (Block 302). For example, in implementations where the transponder 104 comprises a radar transponder, the transponder 104 may detect interrogations transmitted at a frequency of 1030 MHz by ground stations or other TCAS equipped aircraft (e.g., air traffic control ground station 106 or aircraft 108 of FIG. 1). The transponder 104 transmits reply transmissions in response to the interrogations (Block 304). For example, the radar transponder of the TCAS installation may transmit a 1090 MHz Mode A, Mode C, or a Mode S reply transmission as described above in the discussion of FIG. 1.

The ADS-B system 110 monitors the reply transmissions transmitted by the transponder 104 (Block 306). When a reply transmission is transmitted by the transponder ("YES" at Decision Block 308), it is received by the ADS-B system 110 (Block 310) using a receiver associated with the system 110 (e.g., receiver 112 of FIGS. 1 and 2).

Information suitable for use by the ADS-B system 110 is then extracted from the received transmission (Block 312). For instance, in implementations where the transponder 104 comprises a radar transponder configured to transmit Mode A, Mode C, or Mode S reply transmissions, the ADS-B system may extract data such as an assigned Mode 3/A "squawk" code for the aircraft, the IDENT indication for the aircraft, the aircraft's altitude, and the like. In one or more embodiments, the extracted information may be configured to be included in the broadcast by the ADS-B system 110 over the ADS-B datalink. For instance, the extracted information may be formatted so that the information is compatible with ADS-B.

The extracted information is then included in the data broadcast over the ADS-B datalink by the ADS-B system 110 (Block 314). For instance, in one or more embodiments, data broadcast by the ADS-B system 110 may be stored in memory 204 of the ADS-B transceiver 200 (FIG. 2). The extracted information may be used to periodically update this stored data. The stored ADS-B data, which includes the extracted information, may then be included in the data broadcast over the ADS-B datalink by the transmitter/receiver assembly 208. For example, data stored in memory 204 of the ADS-B system 110 may include the aircraft's altitude. During flight, the aircraft's altitude may change, causing new altitude information to become available from reply transmissions transmitted by the transponder 104. This new altitude information is extracted from the reply transmissions and used to update the altitude data stored in memory 204 for broadcast over the ADS-B datalink.

In some embodiments, the periodic broadcast rate of the ADS-B system 110 (e.g., of the transmitter/receiver assembly 208 of the ADS-B transceiver 200 of FIG. 2) may differ from the rate at which the transponder 104 is interrogated and/or reply transmissions are transmitted. For instance, ground-based radar interrogations are generally transmitted at six (6) to twelve (12) second intervals. Accordingly, transponder reply transmissions may be transmitted by the transponder 104 at a corresponding rate. The ADS-B system 110, on the other hand, may broadcast data over the ADS-B datalink at a rate of one (1) broadcast per second or greater. Consequently, in the procedure 300 shown in FIG. 3, the ADS-B data may be broadcast over the ADS-B datalink (Block 314) without first being updated with information extracted from the reply transmission of the transponder 104 when a reply transmission has not been transmitted ("NO" at Decision Block 308). In this manner, the ADS-B system 110 may transmit one or more broadcasts over the ADS-B datalink between receipt of successive reply transmissions from the transponder 104.

Conversely, it is contemplated in one or more embodiments the transponder 104 may transmit one or more reply transmissions between broadcasts by the ADS-B system 110. In such embodiments, data broadcast over the ADS-B datalink may be updated with information extracted from the most recent reply transmission received from the transponder 104. However, it is also possible that information extracted from older reply transmissions of the transponder 104 received between ADS-B transceiver broadcasts may be used to update the ADS-B data instead of information extracted from the most recent reply transmission, or that information extracted from two or more reply transmissions may be combined (e.g., altitude information extracted from successive reply transmissions received from the transponder 104 may be averaged).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for configuring an ADS-B system of an aircraft having a transponder, the method comprising:
    receiving, using a receiver associated with the ADS-B system of the aircraft, a transmission from the transponder of the aircraft;
    extracting information from the transmission to be included in data broadcast over an ADS-B datalink; and
    causing the extracted information to be broadcast over the ADS-B datalink.

2. The method as recited in claim 1, further comprising configuring the information extracted from the transmission for broadcast over the ADS-B datalink.

3. The method as recited in claim 1, wherein the transponder comprises a radar transponder and the transmission comprises a reply transmission to an interrogation of the radar transponder.

4. The method as recited in claim 3, wherein the receiver comprises a 1090 MHz receiver configured to receive a Mode A, Mode C, or Mode S reply transmission from the radar transponder.

5. The method as recited in claim 4, wherein the information extracted from the reply transmission comprises at least one of an assigned Mode 3/A "squawk" code for the aircraft, an IDENT indication for the aircraft, or an altitude of the aircraft.

6. An ADS-B transceiver configured to be mounted in an aircraft comprising:
   a receiver operable to periodically receive transmissions from a transponder of the aircraft, the transmissions containing information that describes at least one of the identity and a status of the aircraft;
   a processing system operable to cause the information to be extracted from the received transmission; and
   a transmitter operable to include the information extracted from the transmission in a broadcast over an ADS-B datalink.

7. The ADS-B transceiver as recited in claim 6, wherein the processing system is further operable to cause the information extracted from the transmission to be configured for broadcast over the ADS-B datalink.

8. The ADS-B transceiver as recited in claim 6, wherein the transponder comprises a radar transponder and the transmission comprises a reply transmission to an interrogation of the radar transponder.

9. The ADS-B transceiver as recited in claim 8, wherein the receiver comprises a 1090 MHz receiver configured to receive a Mode A, Mode C, or Mode S reply transmission from the radar transponder.

10. The ADS-B transceiver as recited in claim 9, wherein the information extracted from the transmission comprises at least one of an assigned Mode 3/A "squawk" code for the aircraft, an IDENT indication for the aircraft, or an altitude of the aircraft.

11. An aircraft comprising:
    a transponder operable to periodically transmit transmissions containing information configured to describe a status of the aircraft; and
    an ADS-B transceiver including:
        a receiver operable to periodically receive a transmission from the transponder;
        a processing system operable to cause the information to be extracted from the received transmission; and
        a transmitter operable to include the information extracted from the received transmission in a broadcast over an ADS-B datalink.

12. The aircraft as recited in claim 11, wherein the processing system is further operable to cause the information extracted from the transmission to be configured for broadcast over the ADS-B datalink.

13. The aircraft as recited in claim 11, wherein the transponder comprises a radar transponder and the transmission comprises a reply transmission to an interrogation of the radar transponder.

14. The aircraft as recited in claim 13, wherein the receiver comprises a 1090 MHz receiver configured to receive a Mode A, Mode C, or Mode S reply transmission from the radar transponder.

15. The aircraft as recited in claim 14, wherein the information extracted from the transmission comprises at least one of an assigned Mode 3/A "squawk" code for the aircraft, an IDENT indication for the aircraft, or an altitude of the aircraft.

16. The aircraft as recited in claim 11, wherein the ADS-B transceiver is independent of the radar transponder.

17. The aircraft as recited in claim 11, wherein the ADS-B transceiver further includes a global navigation satellite system receiver operable to determine a position of the aircraft.

\* \* \* \* \*